(12) United States Patent
Livingston et al.

(10) Patent No.: US 6,683,321 B2
(45) Date of Patent: Jan. 27, 2004

(54) DISC COUNTER

(75) Inventors: Rod Livingston, Richmond, IN (US); Robert Roczynski, Cheshire, CT (US)

(73) Assignee: Record Products of America, Inc., Hamden, CT (US)

( * ) Notice: Subject to any disclaimer, the term of this patent is extended or adjusted under 35 U.S.C. 154(b) by 0 days.

(21) Appl. No.: 09/966,991

(22) Filed: Sep. 28, 2001

(65) Prior Publication Data

US 2003/0062491 A1 Apr. 3, 2003

(51) Int. Cl.[7] .................. G01N 21/88; H01J 40/14; G06M 3/00; G06M 9/00
(52) U.S. Cl. ............... 250/559.47; 250/221; 250/222.1; 377/3; 377/6
(58) Field of Search .................. 250/221, 222.1, 250/559.47; 414/935, 938; 377/3, 6

(56) References Cited

U.S. PATENT DOCUMENTS

| | | | |
|---|---|---|---|
| 4,994,666 A | * | 2/1991 | Higgison et al. |
| 5,315,107 A | * | 5/1994 | Smith et al. |
| 5,408,090 A | | 4/1995 | Craddock |
| 5,457,312 A | * | 10/1995 | Mansour |
| 5,534,690 A | * | 7/1996 | Goldenberg et al. |
| 6,091,792 A | | 7/2000 | Hill et al. |
| 6,137,855 A | | 10/2000 | Hill et al. |
| 6,147,356 A | | 11/2000 | Hahn et al. |
| 6,157,457 A | | 12/2000 | Van Oosterom |

* cited by examiner

Primary Examiner—David Porta
Assistant Examiner—David C Meyer
(74) Attorney, Agent, or Firm—Bachman & LaPointe, P.C.

(57) ABSTRACT

The present invention provides a portable counter and corresponding method for counting articles arranged in a stack, like compact discs and dvds. The portable nature of the counter enables the counter to be brought and placed adjacent to the stack of discs, which are often times relatively much heavier than the counter, for providing an accurate count of the discs. The counter further employs several error checking type functions, which serves to insure and enhance the accuracy of the count, as well as alert the user of potential problems.

16 Claims, 11 Drawing Sheets

DISC COUNTER

FIELD OF THE INVENTION

The present invention relates to counters for counting one or more articles arranged in a stack. More particularly, the present invention relates to a counter for counting discs of the type including compact discs (cds) and dvds arranged on a spindle.

BACKGROUND OF THE INVENTION

Compact discs are frequently handled in large volumes, this is especially true for manufacturers and distributers of compact discs. Correct counts are important to insure customer orders are filled accurately, where shipping too few discs can often result in unhappy customers, and shipping too many discs will often unnecessarily eat into the profits of the manufacturer or distributer. When the volumes become large it becomes ever increasingly more inefficient to manually count the discs. Correspondingly accurate and efficient means for counting a stack of compact discs is desirable.

In the past, various techniques have been tried including simply measuring the height of a stack of discs. In other instances manufacturers have weighed the stack of discs. By knowing the unit height or the unit weight, manufacturers previously attempted to compute the total number of units, based upon the total weight or the total height of the stack of discs. However when compact discs or dvds are manufactured they are allowed a degree of variance within predetermined tolerances. These variances can sometimes make the methods of weighing or measuring the height of the stack somewhat suspect. Furthermore such techniques require that the characteristics of the spindle be taken into account. Consequently more accurate techniques are desirable.

Other previous counters have been developed, two examples of which are described in U.S. Pat. No. 4,994,666 and U.S. Pat. No. 5,315,107, which have taken advantage of an inherent physical feature associated with stacks of discs. When stored, discs generally provide a spacing between each adjacent pair of stacked discs. The spacing or gap is caused by a raised ridge near the center or hub of the disc, sometimes referred to as a boss. The ridge generally extends above the planar surface of the disc on at least one of the sides of the disc. These previous counters use an illuminated source of light having a path, which travels in a direction substantially parallel to the surface of the discs. The previous counters then attempt to detect the light that exits on the other side of the stack of discs. The source of light and the device used to detect the light are then moved relative to the stack of the disc, wherein the path of light is selectively interrupted when the light is received by the stack of discs proximate the edge of a disc, and is allowed to propagate through the discs when the light is received by the stack of discs proximate the gap or spacing between the discs.

These devices are generally larger than the stack of discs and are typically fixed in place. It is generally necessary to bring the discs to be counted to these counter devices and for the stack of discs to be loaded into the machines. For convenience sake it would be beneficial to develop a portable device that could be brought to the discs without sacrificing the accuracy of the counter.

Furthermore, to the extent that the accuracy of the count could be further enhanced, or to the extent that the counter could detect potential problems or errors, such a counter would be further beneficial.

SUMMARY OF THE INVENTION

The present invention provides a portable counter for counting one or more articles arranged in a stack. The portable counter comprises a housing, a radiation source, a radiation detector, one or more motors, and a processor.

The housing is sized to be hand carried, the housing having a handle, and a scan surface for facing toward and placing adjacent to the stack of one or more articles to be counted.

The radiation source is oriented so as to produce radiant energy which radiates in a direction toward the stack of articles positioned adjacent to the scan surface. The radiation detector is spaced apart from and oriented toward the radiation source so as to selectively receive radiant energy from the radiation source and produce a corresponding output signal when the direct path between the radiation source and the radiation detector is unobstructed. The direct path between the radiation source and the radiation detector crosses the space, where the stack of one or more articles to be counted is located.

One or more motors are coupled to the radiation source and the radiation detector for moving both the radiation source and radiation detector along the length of the scan surface and the stacked articles positioned adjacent thereto. As the radiation source and the radiation detector move relative to the adjacent stack of articles the direct path between the radiation source and the radiation detector alternatively passes through the one or more articles and the gaps on either side of the one or more articles. The direct path is obstructed when the path passes through one of the articles.

A processor is coupled to receive the output signal of the radiation detector, and includes a counting module for determining the number of articles intersected by the direct path between the radiation source and the radiation detector, as the radiation source and the radiation detector travel along the scan surface of the housing and the height of the stack of articles positioned adjacent thereto.

In at least a further embodiment the processor further includes a distance tracking module for determining the overall height of the stack of articles, and an error checking module for comparing the number of articles intersected as determined by the counting module with the number of discs corresponding to the overall height of the stack of articles as determined by the distance tracking module.

In at least a still further embodiment the counting module determines a count based upon at least two passes of the radiation source and radiation detector respective to the stack of articles, and in at least two different directions.

The present invention further provides a method for counting one or more articles arranged in a stack. Specifically the method includes radiating energy from a radiation source in a direction nearly parallel to the one or more substantially planar surfaces of the articles being counted, and moving the radiation source along the height of the stack of articles, while generally maintaining the direction the energy is being radiated.

The radiated energy is selectively received at a radiation detector, which moves in conjunction with the radiation source, when the direct path between the radiation source and the radiation detector is not obstructed by the one or more articles being counted. The number of articles intersected by the direct path is determined, while the radiation source and the radiation detector traverse the height of the stack of articles. Additionally, the overall height of the stack of articles is determined.

After determining the number of articles intersected and the overall height of the stack of articles, a comparison is made between the determined number of articles intersected and a number of articles consistent with the determined overall height of the stack of articles for detecting any inconsistencies or errors. A count corresponding to the number of articles, and any inconsistencies or errors is then displayed.

By making multiple different types of measurements and comparing the results, the chances of detecting and reconciling an error is significantly improved.

These and other objects, features, and advantages of this invention are evident from the following description of a preferred embodiment of this invention, with reference to the accompanying drawings.

DETAILED DESCRIPTION OF THE PREFERRED EMBODIMENTS

Figure 1:
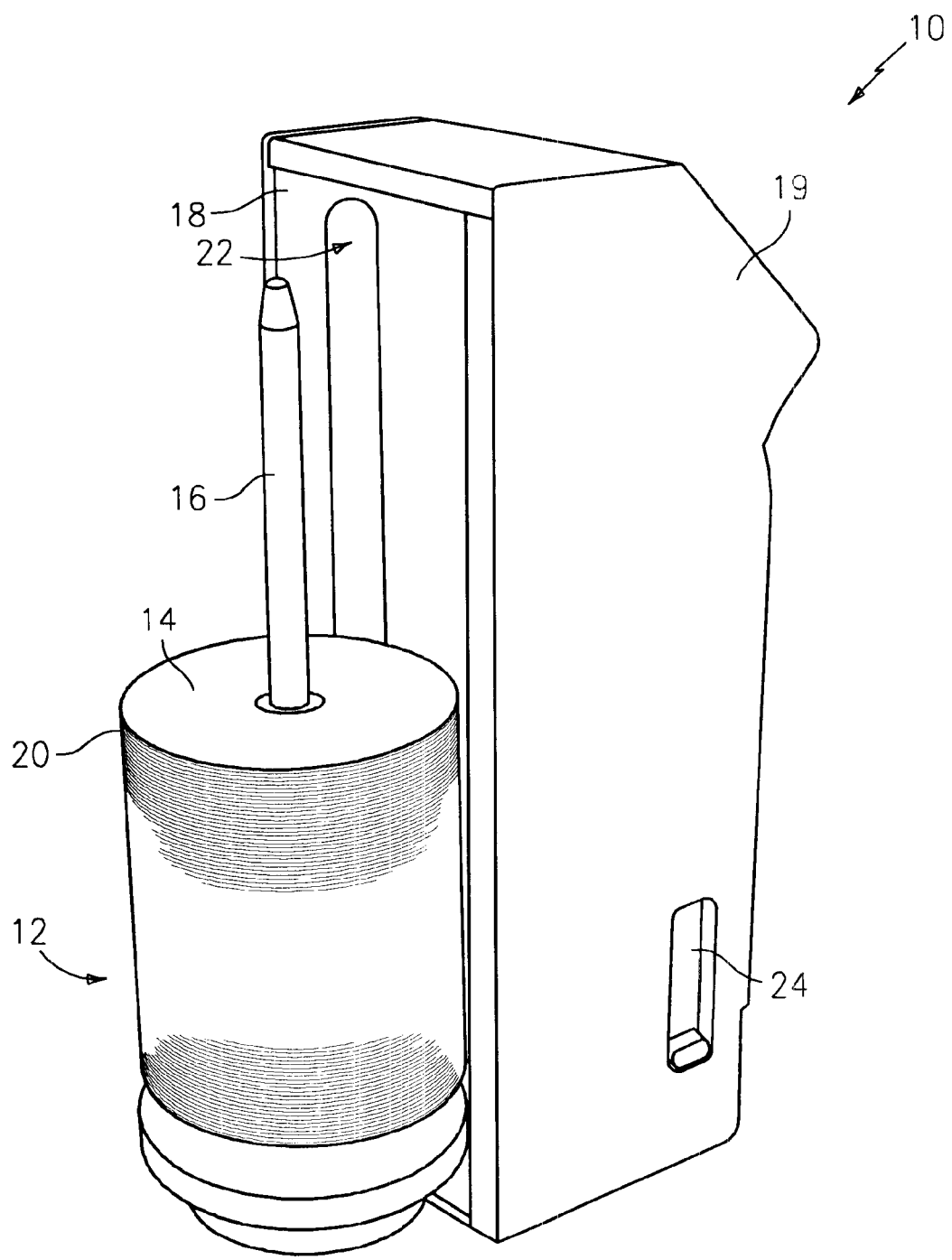
FIG. 1 is an isometric view of one example of a counter for counting a stack of articles in accordance with the present invention, wherein the counter is shown placed adjacent to a stack of article in a manner consistent with counting the articles.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 6:
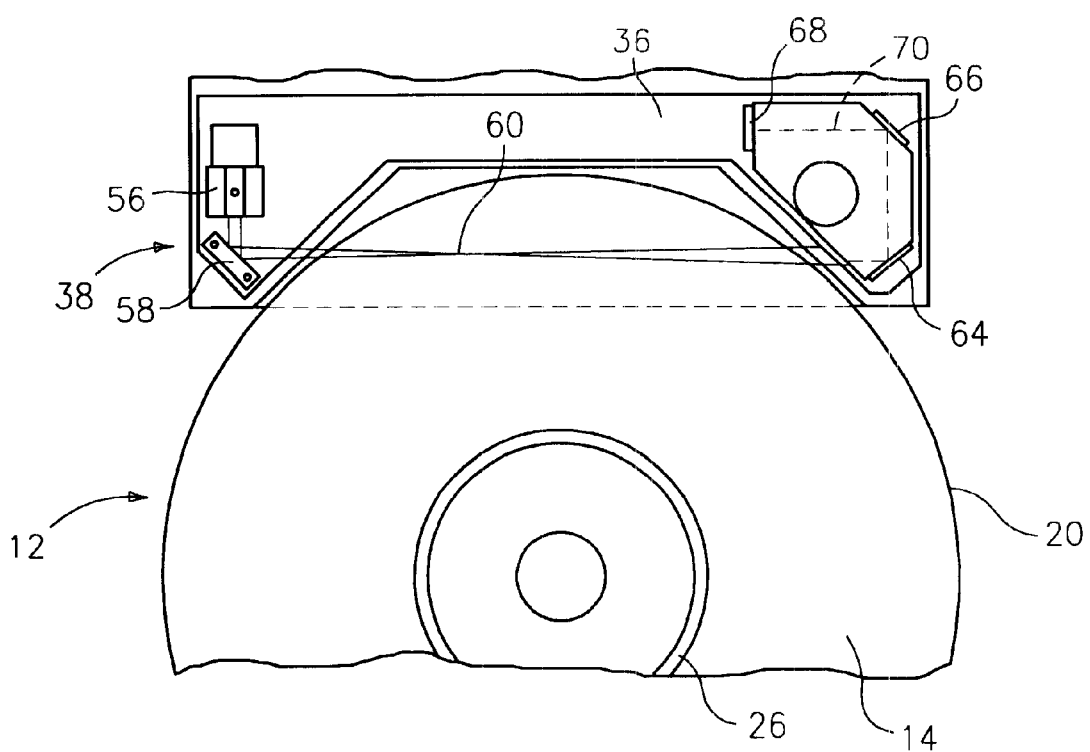
FIG. 6 is bottom cross-sectional plan view illustrating the platform and corresponding radiation source and radiation detector, shown in FIGS. 3–5, in relation to a stack of articles positioned adjacent thereto.

FIG. 1 illustrates a counter 10, in accordance with at least one embodiment of the present invention, for counting one or more articles arranged in a stack. The counter 10 is shown placed adjacent to a stack 12 of discs 14 on a spindle 16. The stack is adjacent to a front panel 18 or scan surface portion of the counter's 10 housing 19. The front panel 18 has a concave surface forming a shallow recess within which the stack of discs can be partially positioned. By allowing the stack 12 of discs to be partially positioned within the recess of the front panel 18, a direct path between a radiation source and a radiation detector, both of which are shown in FIGS. 4–6, to intersect the outer edges 20 of the discs 14 in the stack 12.

The opening 22 in the front panel 18, which exposes the radiation detector, is shown. Further shown in FIG. 1 is the battery compartment 24, which in the preferred embodiment receives a rechargeable lithium-ion battery. The rechargeable lithium-ion battery supplies portable power to the electronic circuitry and electro-mechanical elements of the counter 10, thereby freeing it from the mains power supply during regular operation.

Figure 2:
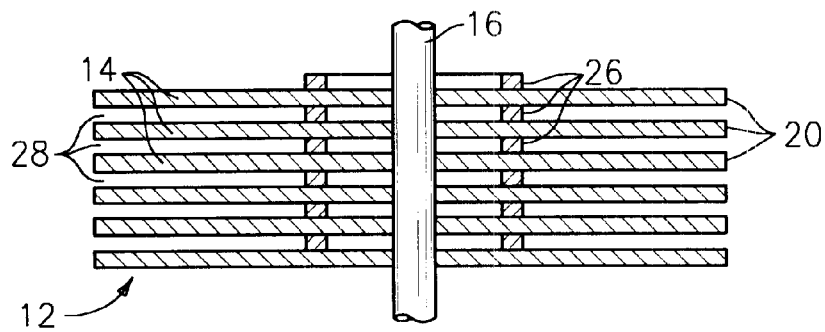
FIG. 2 is a cross-sectional view illustrating several disc type stacked articles positioned on a spindle.

FIG. 2 illustrates a cross-sectional view of several discs 14 stacked on a spindle 16. The cross-sectional view of the discs 14 further illustrate a raised center ridge 26 or hub, also known as a boss. The raised center ridge 26 typically prevents the discs 14 from lying flush with other adjacent discs toward their outer edge 20. Consequently, gaps 28 or spaces are generally formed therebetween. It is through these gaps 28 that radiant energy is caused to be selectively propagated and to be correspondingly detected across a path which intersects the stack 12 of discs 14, the direct path being shown in FIGS. 4 and 6, and being subsequently discussed in greater detail.

Figure 3:
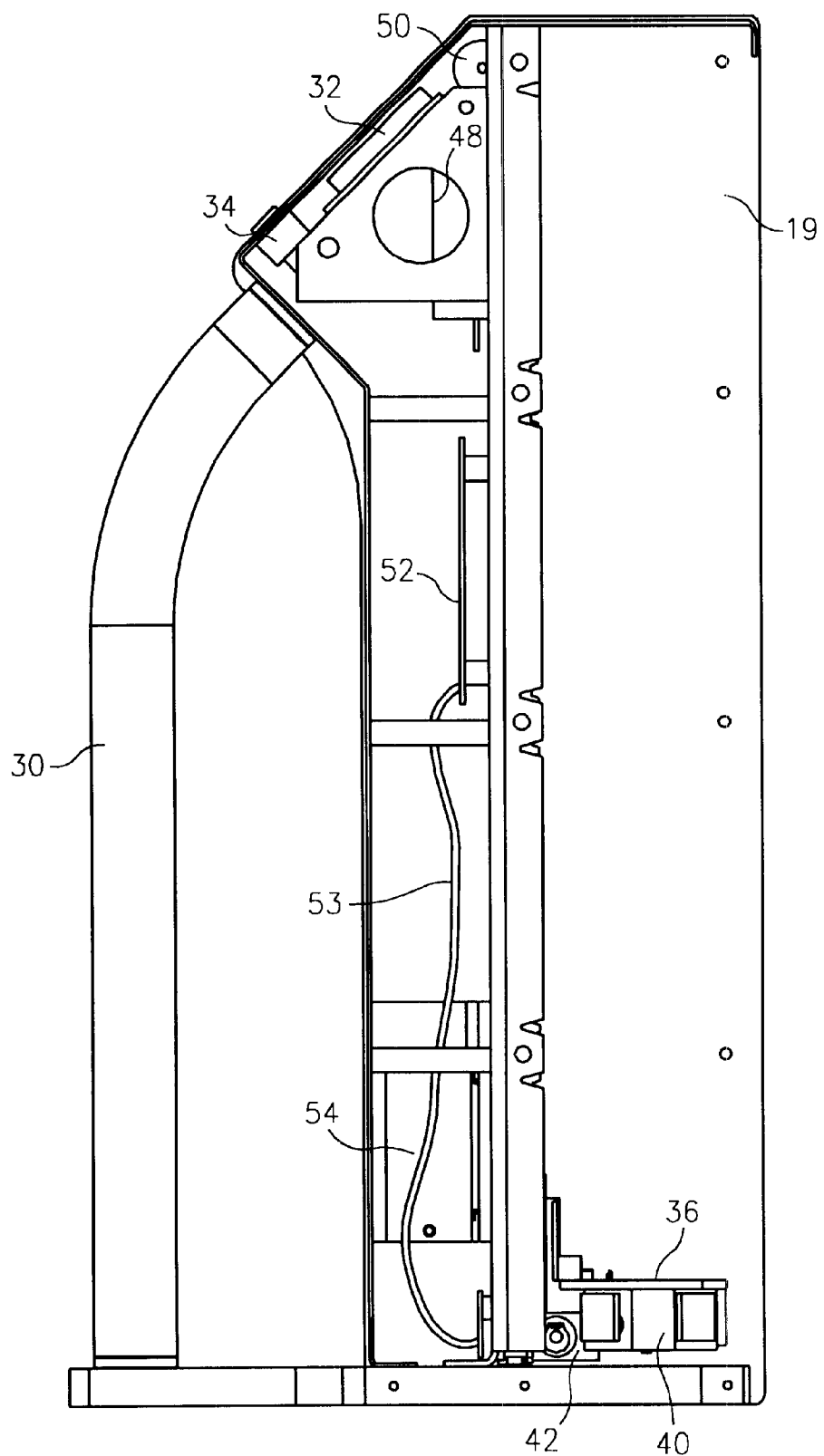
FIG. 3 is a side view of the counter, shown in FIG. 1, with the side cover and front or scan surface removed exposing the interior of the counter.
Figure 4:
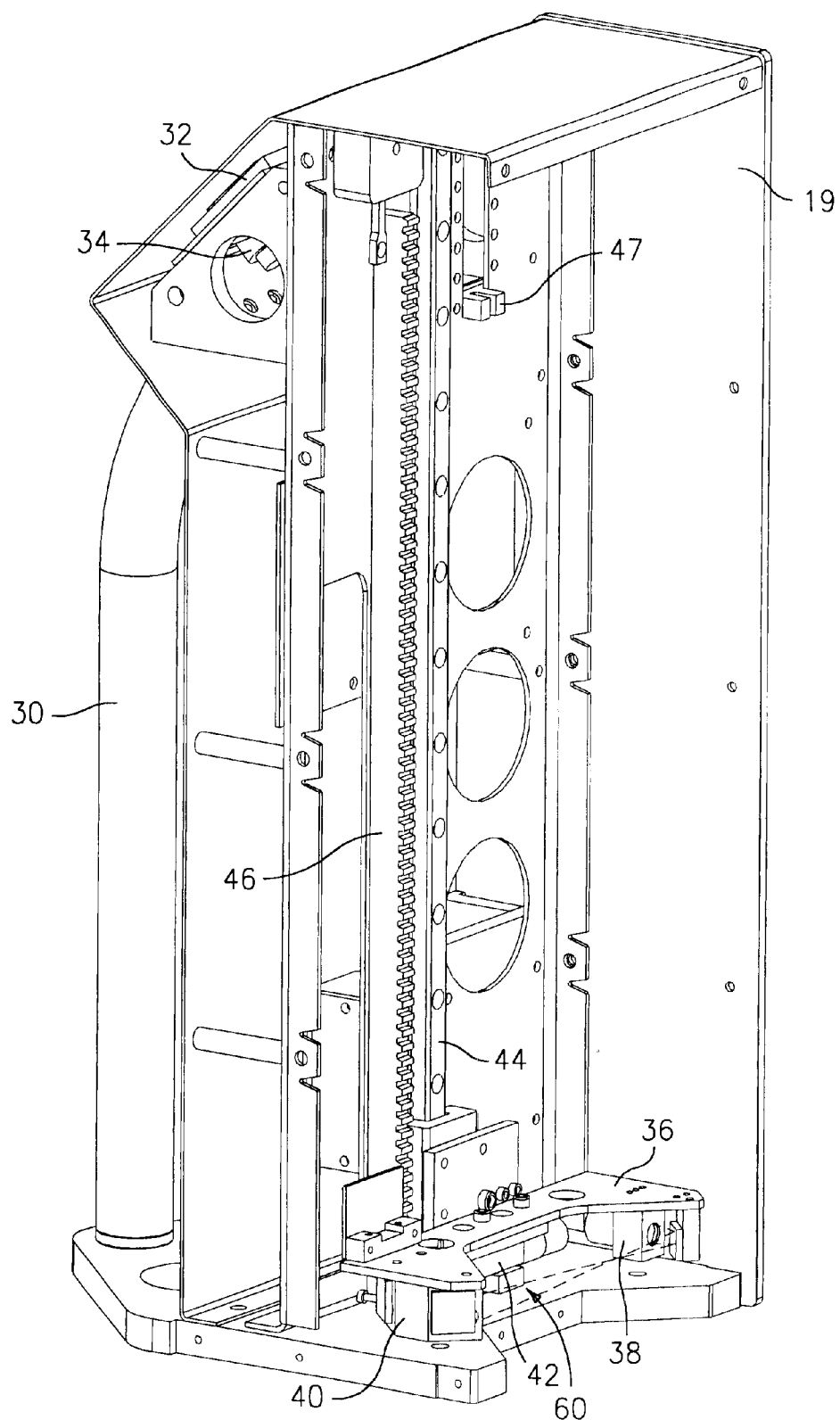
FIG. 4 is an orthogonal view of counter, as shown in FIG. 1, similar to FIG. 3, with side cover and the front or scan surface removed.
Figure 5:
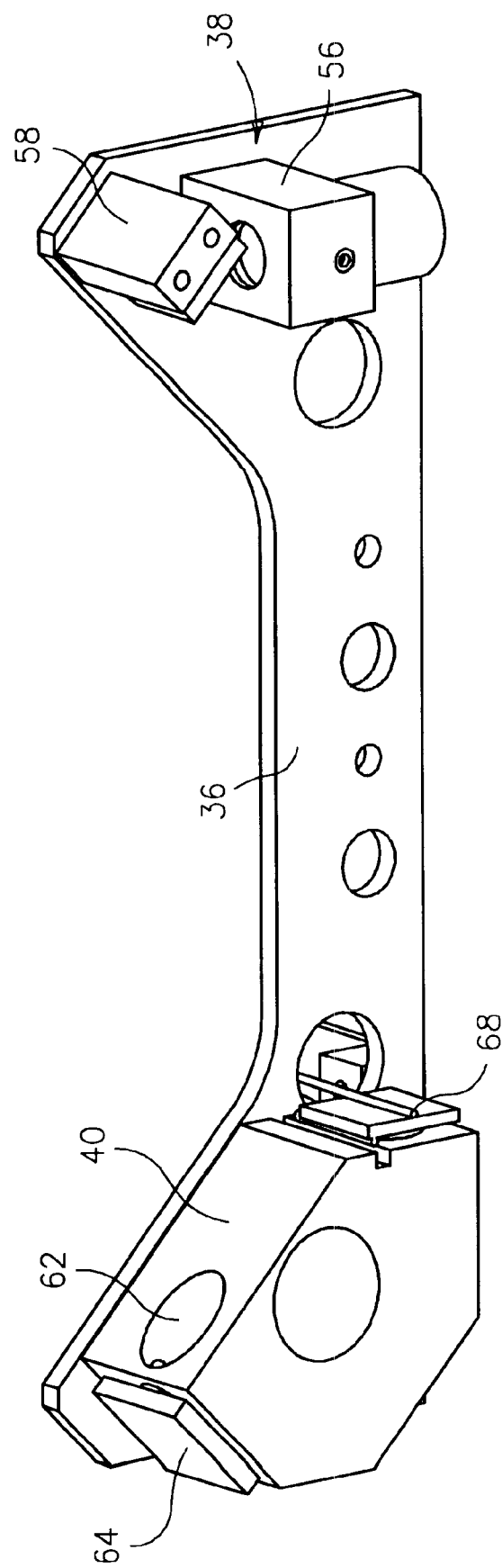
FIG. 5 is a bottom orthogonal view of the platform, shown in FIGS. 3 and 4, with the radiation source and radiation detector placed thereon.

FIGS. 3 and 4 both illustrate the counter 10, with both its front panel 18 and side cover removed, thereby exposing the internals of the counter 10. FIG. 3 is a side plan view. FIG. 4 is an isometric view.

Both FIGS. 3 and 4 also illustrate additional exterior features. For example, the housing 19 additionally includes a handle 30 by which a user can grip and maneuver the counter 10. The counter 10 additionally includes a display 32, which is visible exterior to the counter through a clear window in the housing, and a push button 34 which extends partially through the housing 19.

Internally, the counter 10 includes an optical platform 36 upon which a radiation source 38 or laser/lens assembly, and a radiation detector 40 or radiation detector assembly is received. Further positioned on the optical platform 36 is a motor/gear box assembly 42, which in combination with a rail 44 and rack 46, guide and propel the platform along the rail 44 within the housing 19. In the preferred embodiment the rail 44 extends substantially vertical, thereby facilitating corresponding vertical motion of the platform 36.

Figure 8:
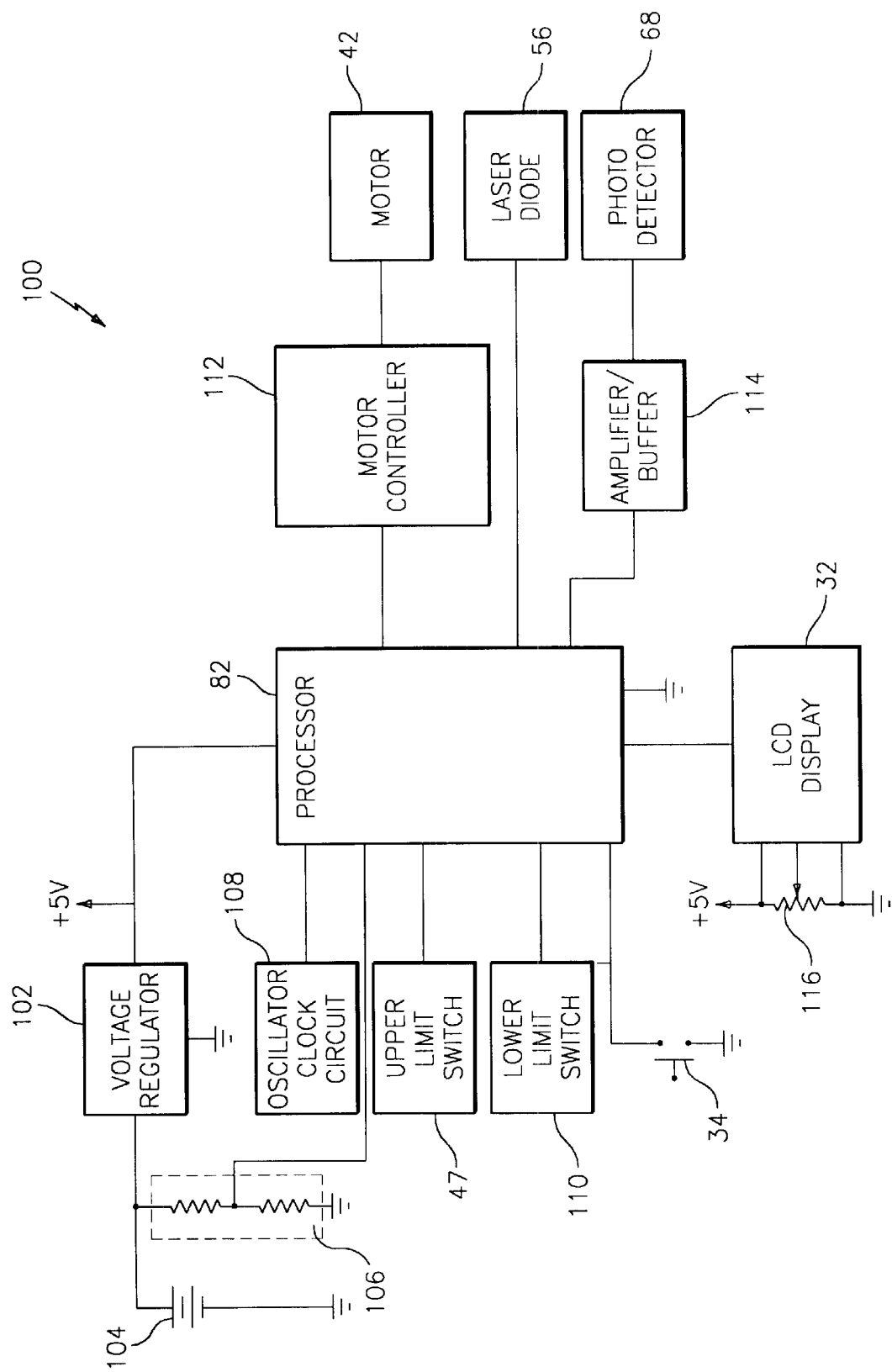
FIG. 8 is a more detailed circuit schematic of the counter, shown in FIGS. 1 and 3–7.
Figure 9A:
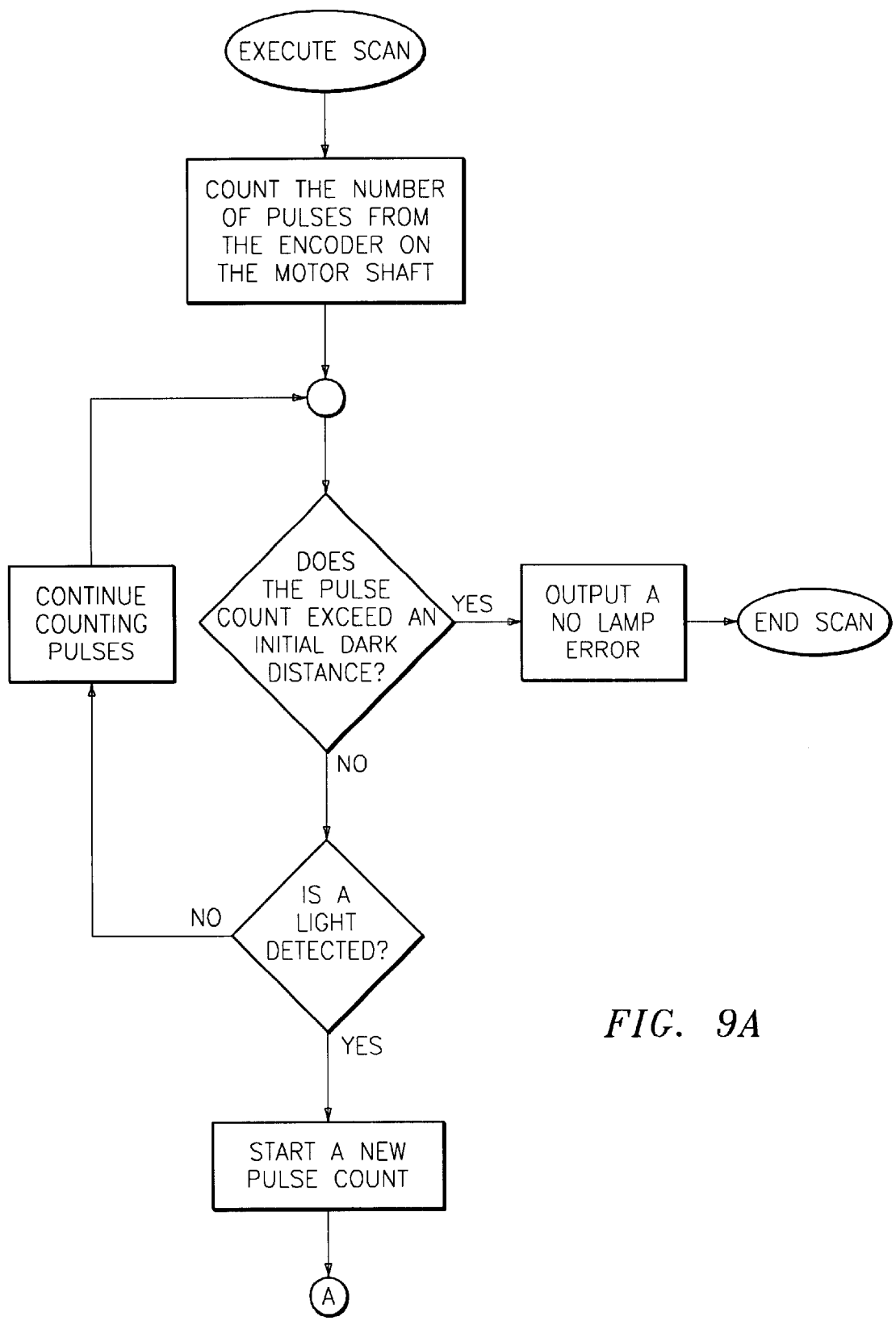
FIG. 9 is a flow diagram of the scanning operation being performed by the processor, shown in FIGS. 7 and 8.
Figure 9B:
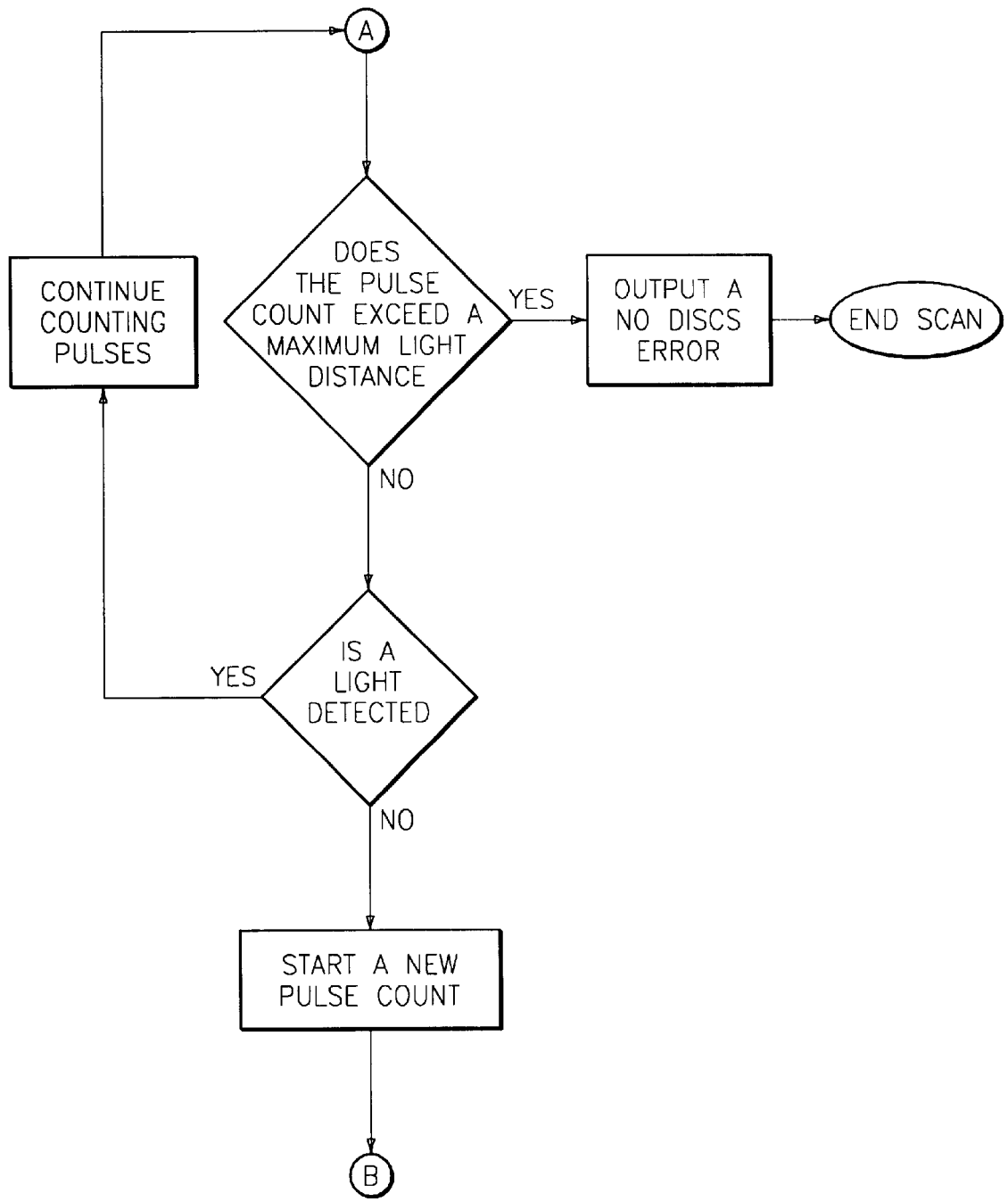
Figure 9C:
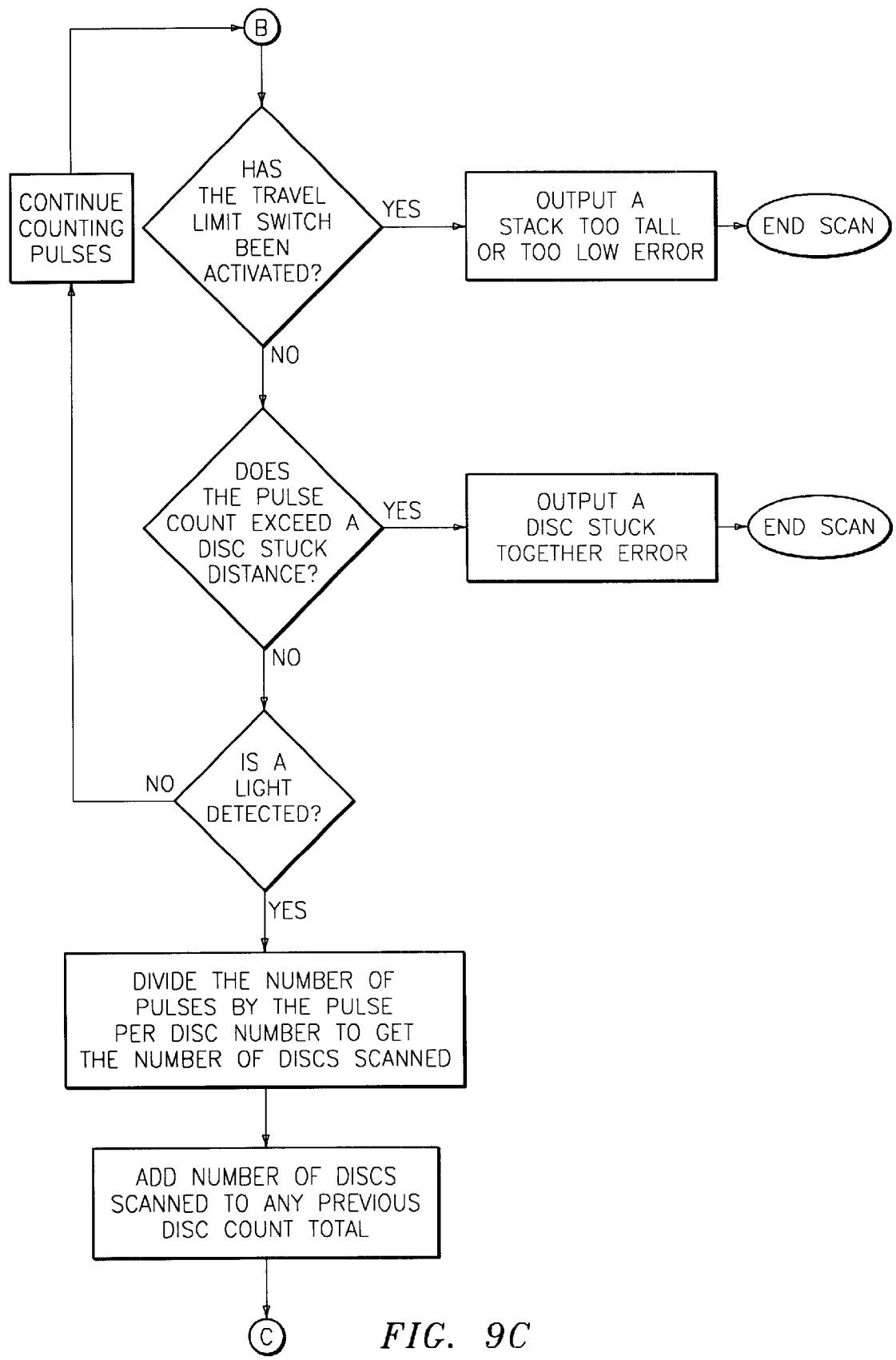
Figure 9D:
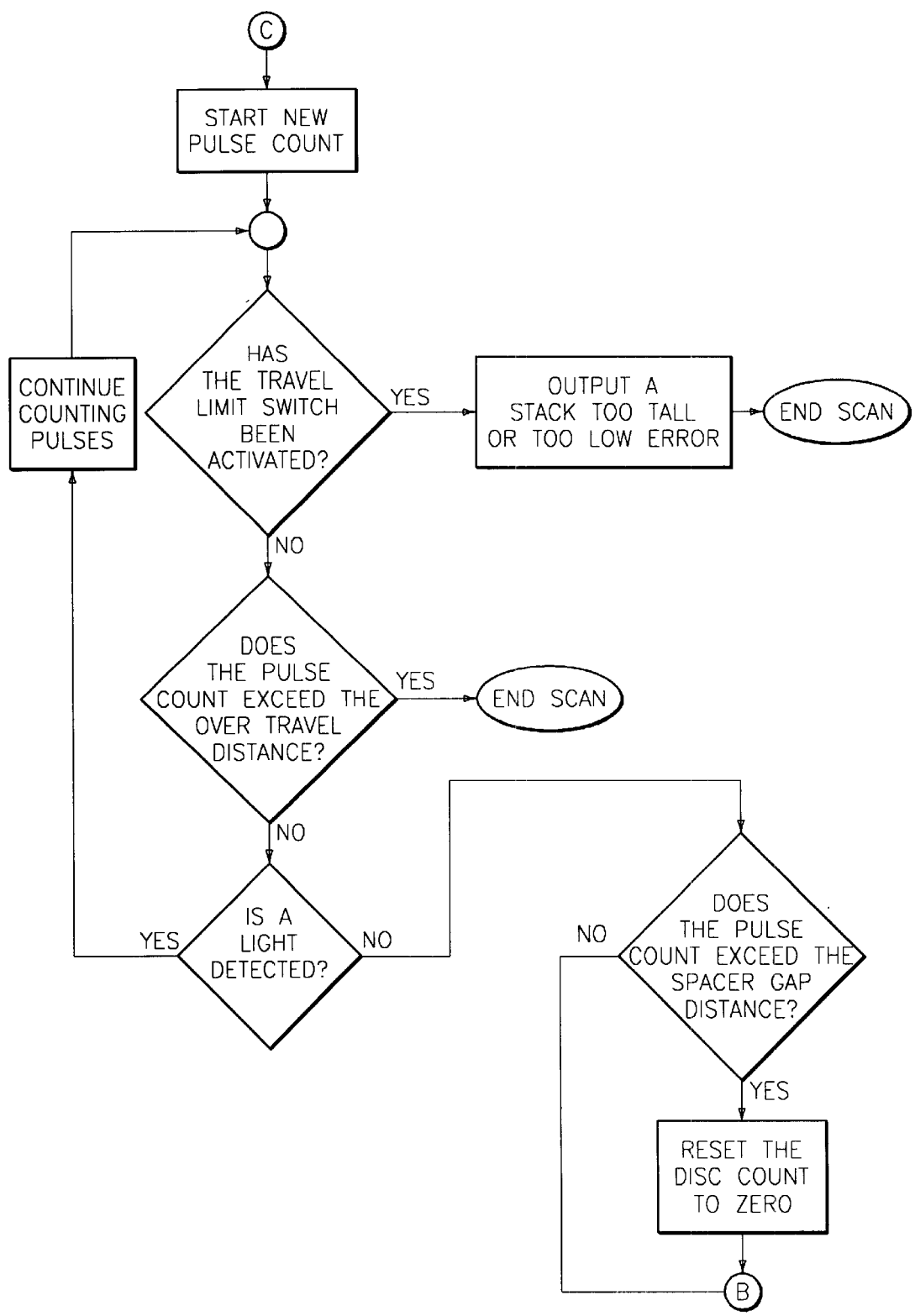

At the upper end of the rail 44 is an upper interrupter switch 47. A corresponding lower interrupter switch, shown only in FIG. 8, is located proximate the lower portion of the rail 44. The interrupter switches include a slot between two corresponding sections. The two corresponding sections include a respective light emitting diode and photo detector. The photo detector receives light from the light emitting diode except when an opaque object occupies the slot between the two corresponding sections. A flag located on the platform 36 is located so as to interfere with the reception of light by the photo detector in the interrupter switches, when the platform is respectively at a defined lower most position and a defined upper most position along said rail 44. The interrupter switches provide feedback to the processor.

A balance spring 48 and corresponding pulley 50 are coupled to both the platform 36 and the housing 19 frame to provide a counter balance force which pulls on the platform 36 in the opposite direction to gravity.

A printed circuit board 52 including the processor and related electronic circuitry is mounted behind the rail 44. The printed circuit board 52 including the processor is coupled to the platform 36 and the corresponding components via a flexible cable 53. The battery assembly 54 is similarly mounted behind the rail 44.

FIG. 5 illustrates an isometric view of the optical platform 36, as well as the radiation source 38 and radiation detector 40 located thereon. As illustrated in the preferred embodiment, the radiation source assembly 38 includes a laser and lens diode 56 and a mirror 58. The laser diode 56 produces a beam of light, which is reflected off of the mirror 58 and toward the radiation detector 40. The particular path 60 of the beam of light being illustrated in FIGS. 4 and 6.

An opening 62 in the radiation detector 40 allows an unobstructed beam of light from the radiation source 38 to enter the radiation detector 40. Internal to the radiation detector 40, the detector 40 includes a pair of mirrors 64 and 66, and a photo detector 68. At least one example of the path 70 the beam of light will take within the radiation detector 40, when otherwise unobstructed, is illustrated in FIG. 6. When the photo detector 68 receives the beam of light, the photo detector 68 produces a corresponding electrical signal, which is coupled to and used by the processor 82 discussed below.

FIG. 6 further shows the path of light in relation with a stack 12 of discs 14. As can be seen the light path 70 crosses through the stack 12. As noted previously this allows the light path 60 to be alternatively transmissive and blocked dependent upon the position of the radiant source 38 and the radiant detector 40 with respect to the discs 14 within the stack 12. The light path is blocked when the light path is aligned with a disc 14, when the light enters the stack 12. The light path is transmissive, when the light path is aligned with the space 28 between the discs 14 when the light enters the stack 12.

Figure 7:
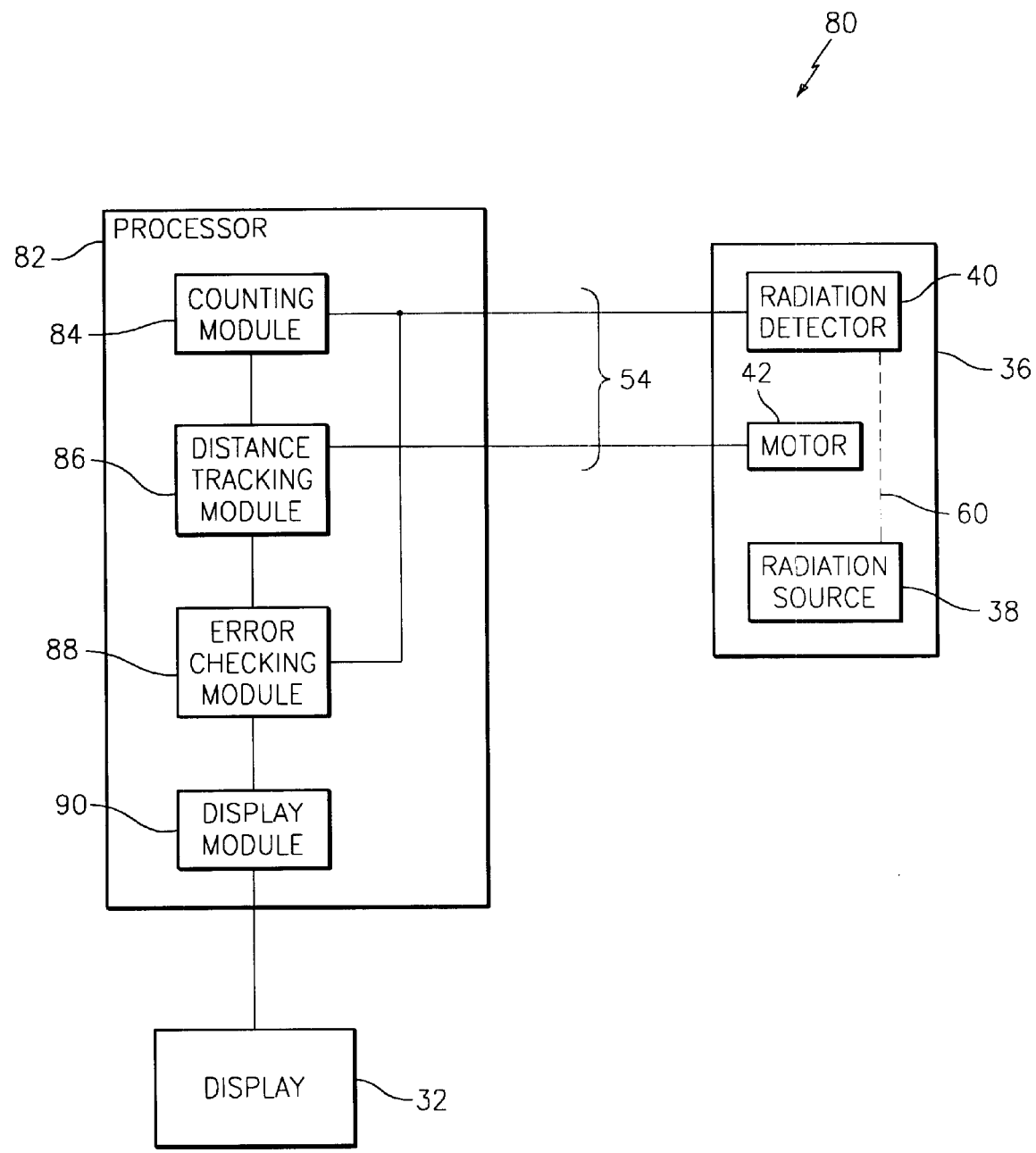
FIG. 7 is a block diagram of the electronic circuitry associated with the counter, shown in FIGS. 1 and 3–6.

FIG. 7 illustrates a block diagram 80 of the electronic circuitry associated with the counter 10. The block diagram 80 includes a processor 82. The processor includes a counting module 84, a distance tracking module 86, an error checking module 88, and a display module 90.

The counting module 84 generally receives the output from the radiation detector 40 and develops a count corresponding to the number of detected discs 14 that are in the stack 12.

The distance tracking module 86 is coupled to the motor 42 and receives signals therefrom from which the processor 82 can determine distance traveled during the scanning of the discs 14. In the preferred embodiment the motor 42 is a gear motor with an encoder, which as the motor turns, the associated gear engages the rack 46 and the motor 42. The platform 36 coupled thereto is propelled in the appropriate direction, and the encoder produces a number of pulses corresponding to the distance traveled. The overall distance traveled is theoretically related to the combined thickness of the stacked discs 14. If you know the general thickness of a single disc 14, the same can be used in connection with the overall stack height to approximate the number of discs 14.

The error checking module 88 is coupled to both the counting module 84 and the distance tracking module 86. The error checking module compares the results from each of the independent methods of calculating the number of discs 14 in the stack 12, and confirms consistency between the two.

In an attempt to further enhance the accuracy of the counter 10, in addition to the counting module 84 determining the number of discs 14 intersected in a first direction, in the preferred embodiment, the counting module 84 repeats the analysis in a second direction as the platform 36 returns to its original start position. The counting module 84 relays the results of the analysis in both directions to the error checking module 88, which is then used to further confirm the accuracy of the results.

The error checking module 88 further stores the data for several preceding counts, which is also used to confirm the accuracy of the present count. So long as the type of disc 14 being counted remains the same, the data is helpful in confirming the accuracy of the count. When the type of disc 14 being counted changes, the preferred embodiment enables one to manually clear the data from the preceding counts. In at least one embodiment of the present invention, four such sets of data from preceding counts is stored and used for comparison.

The display module 90 is coupled to the error checking module and displays the results of the scan including the number of items counted on the display 32, as well as any errors detected.

In at least one embodiment, the counting module 84, the distance tracking module 86, the error checking module 88 and the display module 90 are comprised of programming instructions and data for execution on the processor 82.

FIG. 8 illustrates a more detailed circuit schematic 100 of the block diagram 80 of the electronic circuitry illustrated in FIG. 7. The more detailed circuit schematic 100, similarly includes a processor 82. In the preferred embodiment the processor is a 68HC711 micro-controller. The processor receives power from a voltage regulator 102, which produces a regulated 5V output from an unregulated voltage from a battery 104. In addition to receiving power from the battery 104, via the voltage regulator 102, the processor 82 additionally monitors the output voltage of the battery 104, via a voltage divider network 106. In this way the processor 82 can produce an over voltage warning, if for example the battery voltage exceeds 8.5V, and produce an under voltage warning, if for example the battery voltage falls below 5.7 volts.

The processor is further coupled to an oscillator clock circuit 108 for providing the necessary clocking signal for the operation of the processor 82. The processor is similarly coupled to the upper interrupter limit switch 47, the lower interrupter limit switch 110, and push button switch 34.

The processor 82 is coupled to the motor 42, via a motor controller 112, which converts the control signals received from the processor 82 to the control signals expected by the motor 42. The photo detector is coupled to the processor via an amplifier/buffer circuit 114. One such suitable circuit for the amplifier/buffer circuit is a non-inverting operational amplifier circuit.

Additionally coupled to the display is a potentiometer 116, which is capable of providing contrast control.

FIGS. 9A–9D illustrate a flow diagram of the scanning operation being performed by the processor 82, consistent with at least the preferred embodiment of the present invention.

From the foregoing, it will be observed that numerous modifications and variations can be effected without departing from the true spirit and scope of the novel concept of the present invention. It is to be understood that no limitation with respect to the specific embodiments disclosed herein is intended or should be inferred. The disclosure is intended to cover, by the appended claims, all such modifications as fall within the scope of the claims.

What is claimed:

1. A portable counter for counting one or more articles arranged in a stack, each article including an outer edge, which is generally aligned with and spaced relative to the outer edges of the adjacently stacked articles so as to normally include a gap therebetween, the portable counter comprising:

a housing sized to be hand carried, the housing having a handle, and a scan surface for facing toward and placing adjacent to a space, where the stack of one or more articles to be counted is located;

a radiation source, including a laser diode, oriented so as to produce radiant energy which radiates in a direction toward any stack of articles positioned adjacent to the scan surface;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space, where the stack of one or more articles to be counted is located;

one or more motors coupled to the radiation source and the radiation detector for moving both the radiation source and radiation detector along the length of the scan surface and any stacked articles positioned adjacent thereto, wherein as the radiation source and the radiation detector move relative to the adjacent stack of articles the direct path between the radiation source and the radiation detector alternatively passes through the one or more articles and the gaps on either side of the one or more articles, the direct path being obstructed when the path passes through one of the one or more articles; and a processor coupled to receive the output signal of the radiation detector including a counting module for determining the number of articles intersected by the direct path between the radiation source and the radiation detector, as the radiation source and the radiation detector travel along the scan surface of the housing and the height of any stack of articles positioned adjacent thereto.

2. A portable counter in accordance with claim 1, wherein said processor further includes a display module for displaying the determined number of articles.

3. A portable counter in accordance with claim 1, wherein said radiation source further includes a lens assembly.

4. A portable counter in accordance with claim 1, wherein said one or more articles arranged in a stack are discs.

5. A portable counter for counting one or more articles arranged in a stack, each article including an outer edge, which is generally aligned with and spaced relative to the outer edges of the adjacently stacked articles so as to normally include a gap therebetween, the portable counter comprising:

a housing sized to be hand carried, the housing having a handle, and a scan surface for facing toward and placing adjacent to a space, where the stack of one or more articles to be counted is located;

a radiation source which is oriented so as to produce radiant energy which radiates in a direction toward any stack of articles positioned adjacent to the scan surface;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space, where the stack of one or more articles to be counted is located;

one or more motors coupled to the radiation source and the radiation detector for moving both the radiation source and radiation detector along the length of the scan surface and any stacked articles positioned adjacent thereto, wherein as the radiation source and the radiation detector move relative to the adjacent stack of articles the direct path between the radiation source and the radiation detector alternatively passes through the one or more articles and the gaps on either side of the one or more articles, the direct path being obstructed when the path passes through one of the one or more articles; and a processor coupled to receive the output signal of the radiation detector including:
  a counting module for determining the number of articles intersected by the direct path between the radiation source and the radiation detector as the radiation source and the radiation detector travel along the scan surface of the housing and the height of any stack of articles positioned adjacent thereto;
  a distance tracking module for determining the overall height of the stack of articles; and
  an error checking module for comparing the number of articles intersected determined by the counting module with the overall height of the stack of articles determined by the distance tracking module.

6. A portable counter in accordance with claim 5, wherein the error checking module of said processor further remembers the measurements associated with one or more previous article counts for a similar type of article being presently counted and compares those measurements with the current measurements for determining if an error occurred during the present count.

7. A portable counter for counting one or more articles arranged in a stack, each article including an outer edge, which is generally aligned with and spaced relative to the outer edges of the adjacently stacked articles so as to normally include a gap therebetween, the portable counter comprising:

a housing sized to be hand carried, the housing having a handle, and a scan surface for facing toward and placing adjacent to a space, where the stack of one or more articles to be counted is located;

a radiation source which is oriented so as to produce radiant energy which radiates in a direction toward any stack of articles positioned adjacent to the scan surface;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space, where the stack of one or more articles to be counted is located;

a platform upon which both the radiation source and the radiation detector are positioned and travel upon;

one or more motors coupled to the radiation source and the radiation detector for moving both the radiation source and radiation detector along the length of the scan surface and any stacked articles positioned adjacent thereto, wherein as the radiation source and the radiation detector move relative to the adjacent stack of articles the direct path between the radiation source and the radiation detector alternatively passes through the one or more articles and the gaps on either side of the one or more articles, the direct path being obstructed when the path passes through one of the one or more articles; and a processor coupled to receive the output signal of the radiation detector including a counting module for determining the number of articles intersected by the direct path between the radiation source and the radiation detector, as the radiation source and the radiation detector travel along the scan surface of the housing and the height of any stack of articles positioned adjacent thereto.

8. A portable counter in accordance with claim 7 further comprising a track which extends vertically lengthwise within the housing along which the platform travels.

9. A portable counter in accordance with claim 8, further comprising at the upper end of the track an upper limit switch, and at the lower end of the track a lower limit for detecting the proximity of the platform as being at or near the corresponding end of the track.

10. A counter for counting one or more articles arranged in a stack, each article including an outer edge, which is generally aligned with and spaced relative to the outer edges of the adjacently stacked articles so as to normally include a gap therebetween, the portable counter comprising:

a housing having a scan surface for facing toward and placing adjacent to a space, where the stack of one or more articles to be counted is located;

a radiation source which is oriented so as to produce radiant energy which radiates in a direction toward any stack of articles positioned adjacent to the scan surface;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space, where the stack of one or more articles to be counted is located;

one or more motors coupled to the radiation source and the radiation detector for moving both the radiation source and radiation detector along the length of the scan surface and any stacked articles positioned adjacent thereto, wherein as the radiation source and the radiation detector move relative to the adjacent stack of articles the direct path between the radiation source and the radiation detector alternatively passes through the one or more articles and the gaps on either side of the one or more articles, the direct path being obstructed when the path passes through one of the one or more articles; and a processor coupled to receive the output signal of the radiation detector including:
  a counting module for determining the number of articles intersected by the direct path between the radiation source and the radiation detector, as the radiation source and the radiation detector travel along the scan surface of the housing and the height of any stack of articles positioned adjacent thereto;
  a distance tracking module for determining the overall height of the stack of articles;
  an error checking module for comparing the number of articles intersected determined by the counting module with the overall height of the stack of articles determined by the distance tracking module; and
  a display module for displaying the determined number of articles.

11. A counter for counting one or more articles in accordance with claim 10, wherein the counting module separately determines a number of articles intersected in two directions of travel.

12. A method for counting one or more articles arranged in a stack, each article having an outer edge which is generally aligned with the outer edges of the other articles in the stack, and at least one substantially planar surface, wherein when stacked the outer edges of each adjacently stacked article is spaced apart thereby forming a gap therebetween, the method comprising:

radiating energy from a radiation source in a direction nearly parallel to the one or more substantially planar surfaces of the articles being counted;

moving the radiation source along the height of the stack of articles, while generally maintaining the direction the energy is being radiated selectively receiving the radiated energy at a radiation detector moving in conjunction with the radiation source, when the direct path between the radiation source and the radiation detector is not obstructed by the one or more articles being counted;

determining the number of articles intersected by the direct path, while the radiation source and the radiation detector traverse the height of the stack of articles;

determining the overall height of the stack of articles;

comparing the determined number of articles intersected and the number of articles consistent with the determined overall height of the stack of articles for detecting any inconsistencies or errors; and displaying a count of the number of articles, and any inconsistencies or errors.

13. A method in accordance with claim 12, wherein determining the number of articles intersected by the direct path includes a first determination based upon the number of articles intersected by the direct path as the radiation source and the radiation detector travel along the height of the stack of articles in a first direction, and a second determination based upon the number of articles intersected by the direct path as the radiation source and the radiation detector travel along the height of the stack of articles in a second direction.

14. A method in accordance with claim 13 wherein comparing the determined number of articles intersected and the number of articles consistent with the determined overall height of the stack of articles includes comparing both the number of articles intersected during the first determination and the number of articles intersected during the second determination with the number of articles consistent with the determined overall height of the stack of articles.

15. A portable counter for counting one or more articles arranged in a stack, each article including an outer edge, which is generally aligned with and spaced relative to the outer edges of the adjacently stacked articles so as to normally include a gap therebetween, the portable counter comprising:

a housing sized to be hand carried, the housing having a handle, and a scan surface for facing toward and placing adjacent to a space, where the stack of one or more articles to be counted is located;

a radiation source which is oriented so as to produce radiant energy which radiates in a direction toward any stack of articles positioned adjacent to the scan surface;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space, where the stack of one or more articles to be counted is located, the radiation detector including a photo detector and one or more mirrors disposed in the path of the received radiant energy;

one or more motors coupled to the radiation source and the radiation detector for moving both the radiation source and radiation detector along the length of the scan surface and any stacked articles positioned adjacent thereto, wherein as the radiation source and the radiation detector move relative to the adjacent stack of articles the direct path between the radiation source and the radiation detector alternatively passes through the one or more articles and the gaps on either side of the one or more articles, the direct path being obstructed when the path passes through one of the one or more articles; and a processor coupled to receive the output signal of the radiation detector including a counting module for determining the number of articles intersected by the direct path between the radiation source and the radiation detector, as the radiation source and the radiation detector travel along the scan surface of the housing and the height of any stack of articles positioned adjacent thereto.

16. A counter for counting one or more articles arranged in a stack, each article including an outer edge, which is generally aligned with and spaced relative to the outer edges of the adjacently stacked articles so as to normally include a gap therebetween, the portable counter comprising:

a housing having a scan surface for facing toward and placing adjacent to a space where the stack to be counted is located;

a radiation source which is oriented so as to produce radiant energy beam which radiates in a direction toward the stack positioned adjacent in said space;

a radiation detector spaced apart from and oriented toward the radiation source so as to selectively receive radiant energy from the radiation source and produce a corresponding output signal when the direct path between the radiation source and the radiation detector is unobstructed, wherein the direct path between the radiation source and the radiation detector crosses the space;

a motor for moving the beam along the length of the stack so that the beam alternatively passes through the gaps on either side of the one or more articles; and a processor coupled to receive the output signal of the radiation detector including:
  a counting module for determining a number of articles intersected by the beam as the beam travels along the stack;
  a distance tracking module tracking distance traveled by the beam along the stack during said moving; and
an error checking module for checking errors based upon the number of articles determined by the counting module and the distance tracked by the distance tracking module.

* * * * *